Jan. 18, 1955  G. A. ARGABRITE  2,700,109
RADIATION DOSIMETER
Filed June 7, 1951
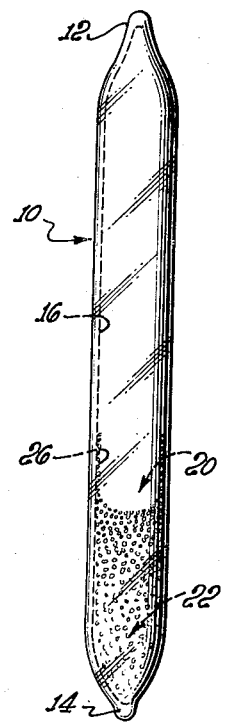
Fig. 1.
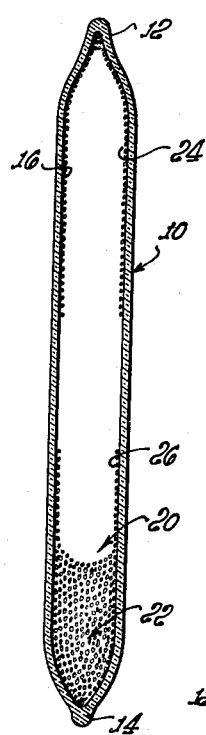
Fig. 2.
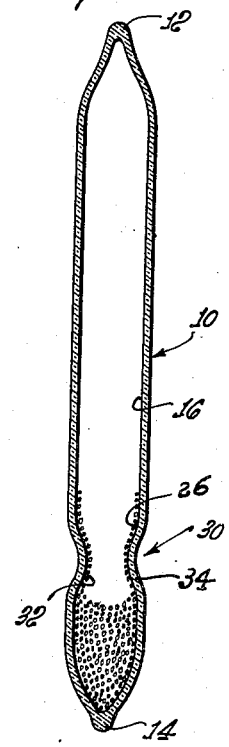
Fig. 3.
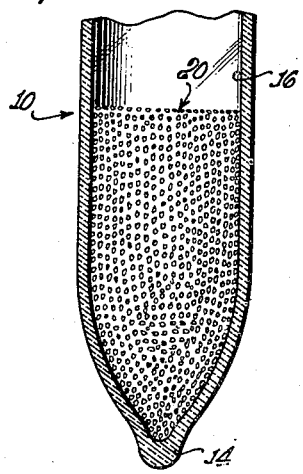
Fig. 4.
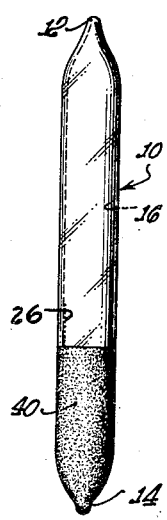
Fig. 5.
INVENTOR.
GEORGE A. ARGABRITE,
BY
ATTORNEY.

United States Patent Office 2,700,109
Patented Jan. 18, 1955

2,700,109

RADIATION DOSIMETER

George A. Argabrite, North Hollywood, Calif., assignor, by mesne assignments, to Pacific Transducer Corporation, Los Angeles, Calif., a corporation of California Application June 7, 1951, Serial No. 230,328

9 Claims. (Cl. 250—83.3)

This invention relates generally to an instrument for detecting and measuring nuclear radiation and more particularly is directed to a conveniently carried device useable by the layman and capable of visually indicating not only the presence and intensity of nuclear radiation but also a cumulative measure of such radiation over an extended period of time.

With the increasing importance of radioactive materials in military and industrial activities and with increasing medical knowledge of harmful physiological effects caused by radiation from such materials, it has become of utmost importance to provide means for protecting personnel from an overdose of radiation. The deleterious effects on the human body have become generally known as "radiation sickness" and this sickness is typically manifested by nausea, diarrhea and a sharp drop in the white blood cell count observable one or two days following exposure with resultant vulnerability of the body to infection.

Elaborate and necessarily expensive instruments have been developed to measure the strength of nuclear radiation in order that personnel exposed thereto may avoid areas of heavy contamination, and may be removed entirely from a contaminated region when the cumulative dosage received by any individual exceeds a predetermined amount. The instruments referred to have taken the form of ionization chambers, Geiger-Müller counters and other apparatuses which function by measuring the ability of the radiation to cause ionization. Aside from being expensive in construction, these instruments are subject to the disadvantage of readily falling out of calibration, so that accurate measurements can be obtained only by frequent calibration and by use of the instruments by experienced personnel.

Efforts have been made to provide less expensive devices for measuring nuclear radiation, for example calibrated electroscopes and photographic films to measure cumulated dosage. These devices are admittedly not of the accuracy obtainable by a carefully calibrated ionization chamber or Geiger-Müller counter, but they yield results having sufficient accuracy for many purposes. However, the electroscope type of dosimeter is comparatively expensive for mass distribution and in at least some forms it must be charged after use by special equipment operated by technically trained personnel. The photographic film dosimeter has the inherent disadvantage of requiring photographic processing facilities in order to determine the dosage to which it has been exposed; furthermore no instantaneous reading or indication of exposure is available to the user.

The device of the present invention, in its preferred embodiment, is easily and economically made from materials which are not likely to be in short supply in case of national emergency. Moreover, the device may be prepared for use by personnel having a minimum of training and it provides not only an instantaneous indication of nuclear radiation but also an indication of the cumulative dosage received by a person carrying the device over a period of time.

An object of the invention therefore is to disclose a novel device for detecting and measuring nuclear radiation.

Another object of the invention is to disclose such a device of lightweight construction and capable of being conveniently carried by the user.

A further object is to disclose a nuclear radiation dosimeter whose indications, both instantaneous and cumulative, are readily understandable by the layman with a minimum of training.

Still another object of the invention is to disclose a nuclear radiation dosimeter whose accuracy is independent of ambient temperature and pressure within ranges which a person can withstand.

A still further object is to provide a device of the class described which may be used under water without any sacrifice of accuracy.

A still further object is to disclose a device which, after a period of use, may be immediately recharged by hand and which may be reused indefinitely.

A further object is to disclose such a device of inexpensive yet durable construction providing an accuracy sufficient for mass use.

Other objects and purposes of the invention will become clear to those skilled in the art from a study of the following description of a preferred embodiment of the same taken in connection with the accompanying drawing in which:

Fig. 1 is an elevational view of the device of my invention in fully charged condition.

Fig. 2 is an elevational view in section of the device in fully charged condition and subjected to an external electrostatic field.

Fig. 3 is an elevational view in section of a modified form of the device in fully charged condition.

Fig. 4 is a fragmentary elevational view in section of the lower portion of the device when completely discharged.

Fig. 5 is a side elevational view of a device of my invention in modified form wherein a portion of the container is made opaque.

Generally speaking, my invention contemplates the provision of a hollow, hermetically sealed container made of a dielectric material which is at least translucent and is preferably transparent. The container is preferably in the form of an elongated tube having a smooth inner surface. Within the container is disposed a very large number of minute elements of dielectric material preferably taking the form of spheres having a diameter of the order of 1 mm. As will be fully described hereinafter, the device may be charged so that the minute elements are caused to cling to the smooth inner wall of the container. Subsequent exposure to nuclear radiation causes a number of the minute elements to lose their charge, the number being a function of the intensity and duration of the incident radiation. The charge on the minute elements having been dissipated, they no longer cling to the inner wall of the container and therefore drop to the bottom thereof.

Referring now to the drawing, in Fig. 1 is shown a preferred form of container, indicated generally at 10, which may assume the shape of a hollow, tubular member hermetically closed at its top and bottom ends 12 and 14 respectively. Container 10 may be made of glass or other suitable dielectric material as pointed out in greater detail hereinafter and is provided with a smooth inner wall 16.

Within container 10 is a very large number of minute elements, indicated generally at 20, made of a dielectric material. I prefer to form minute elements 20 of a polystyrene and in the shape of spheres having diameters of approximately 1 mm. although such material, shape and size are not necessary for satisfactory functioning of the device. Such elements may be called "microspheres" and will be so referred to herein.

When my dosimeter is in completely discharged condition, as shown in Fig. 4, all microspheres 20 collect together at the bottom of container 10 under the force of gravity. In order to charge the instrument, container 10 is vigorously shaken a number of times in a direction substantially parallel to its length and it will then be found that microspheres 20 will dispose themselves approximately as shown in Fig. 1. That is, a portion of the microspheres will remain at the bottom 14 of container 10, this portion being indicated generally at 22. The remaining microspheres will dispose themselves generally along the inner wall 16 of container 10 immediately above microspheres 22 as indicated generally at 26, and will cling to said inner wall 16. I believe that the force holding microspheres 26 in position is the electrostatic attraction between opposite charges created upon each microsphere and container 10. It will be noted that the upper microspheres 26 assume the shape of an exaggerated meniscus.

I have found that the proportion of microspheres 26 which will cling to the inner wall 16 of container 10 is not substantially affected after a limited number of vigorous shakings. In other words, a saturation condition is soon reached in charging the instrument, this condition existing after approximately 50 to 60 shakings of the instrument by hand. In such condition, additional shakings will not cause an appreciably greater number of microspheres to cling to the inner wall 16 of the container. The charged instrument may be reversed end for end and it will be found that the number of microspheres clinging to the inner wall will be the same regardless of which end of the container is upward.

Exposure to ionizing radiation, for example gamma radiation or X-ray, will cause one or more of the microspheres 26 clinging to the inner wall of container 10 to fall to the bottom of the container. It is believed that the radiation traversing the inside of container 10 causes ionization of the air or other gas within the container, with resultant discharge of the charge existing between one or more microspheres and the container itself. The number of microspheres discharged is proportional to the strength of the radiation and to the length of time the instrument is exposed to such radiation. A cumulative measure of incident radiation is thus afforded, since the number of microspheres 26 which remain clinging to the inner wall of container 10 gives an immediate indication of the degree to which the instrument has not yet been discharged.

It is very important, in constructing the device of my invention, that the interior of the container and the microspheres themselves be thoroughly dry. Even a relatively small amount of moisture existing in the interior of the container 10 will seriously affect the accuracy of the instrument. Any of many desiccating techniques well known in the art may be employed, the details of which need not be set forth herein since they form no part of the present invention. In addition to moisture, any other impurities present within the container will likewise adversely affect the accuracy of performance of the instrument.

I have found that the accuracy and operability of my instrument are completely unaffected by the presence of an external magnetic field. On the other hand, when the instrument, in charged condition, is subjected to an external electrostatic field, it behaves as shown in Fig. 2. The meniscus 26 remains as before and, in addition, a number of microspheres cling to the inner wall in the upper portion of container 10, as indicated generally at 24. With the removal of the external charge, microspheres 24 fall to the bottom of container 10.

The phenomenon just described provides a convenient means for detecting a source of alpha radiation, which as is well known will not penetrate a barrier of appreciable thickness such as the wall of container 10. An electrostatic charge is created on the outer surface of container 10 as by rubbing on a piece of fabric. While the charge remains, the instrument acts as shown in Fig. 2. By bringing the instrument close to a source of alpha radiation, the ionizing effect of such radiation in the air surrounding the container will cause the external charge on container 10 to be dissipated, with the result that one or more of the microspheres 24 fall to the bottom. Thus an instantaneous indication of ionizing radiation is provided, including alpha radiation.

No other external phenomena have any measurable effect upon the accuracy of the instrument, at least within the range of such phenomena which can be tolerated by human beings. Thus the effects of ambient temperature and pressure are immaterial for all practical purposes. Obviously no external source of power is needed, as is the case with some dosimeters of the electroscope type proposed in the past.

In Fig. 3 is shown a modified form of the present invention by which readings of greater accuracy may be attained. A portion of container 10 is formed to have a restricted cross-section, as shown at 30 in Fig. 3. When the instrument is mounted in a stationary vertical position (as on the wall of the laboratory or the like) it will be seen that microspheres 32, clinging to the portions 34 of inner wall 16, will be certain to fall to the bottom of container 10 when discharged, since gravity directly pulls them from those portions of the inner wall. In the case of the form of the invention shown in Fig. 1, if the device is subjected to ionizing radiation while stationary, some microspheres, although electrically discharged may be restrained from falling to the bottom of the container by adjacent microspheres. This failure obviously cannot occur when the instrument is carried on a person or otherwise moved about, since such movement serves to disengage a discharged microsphere from any support furnished by an adjacent microsphere.

In order to make the instrument of my invention more readily readable, one end of container 10 may be made opaque, as indicated at 40 in Fig. 5. When the instrument is in charged condition, the upper tips of meniscus 26 are plainly visible, and their concealment by opaque portion 40 upon discharge gives to the user an immediate and unmistakable indication of danger.

A further important advantage of the present invention is that it may be used under water with as great facility and accuracy as in the atmosphere, by reason of the fact that it is physically a closed system. In this way decontamination or rescue personnel may move about freely, both above and below water, with assurance that the total radiation to which they may be exposed is being measured in order to provide a basis for removal of such personnel from a danger area before an overdose of radiation is incurred.

The dielectric materials of which the container and microspheres are made may be of many different compositions subject only to the requirement that the material of the container must differ from the material of the microspheres. I have found that good results are obtained with a "pyrex" transparent container and polystyrene microspheres. The materials of both container and microspheres must of course have a high volume and surface resistivity. This is true because the microspheres must be given an electrostatic charge by a vigorous shaking of the container, and the charge thus existing on the microspheres must be retained as well as possible until discharged by the ionizing effect of incident radiation.

The gas within the container may be air at substantially atmospheric pressure, or if desired may be partially evacuated. In either case the gas in the container must be thoroughly dried so that the entire interior of the sealed container is dehydrated. Other gases may be used in place of air, and in general the lower the pressure of whatever gas is used, the lesser the sensitivity of the instrument. Stated differently, the lower the gas pressure, the greater will be the total quantity of incident radiation needed to completely discharge the device.

The total incident gamma radiation needed for complete discharge of the instrument will vary, as indicated above, with the pressure of the gas and also will vary with the type of gas used. However, it may be stated that a typical construction made and tested by me has a total capacity of approximately five Roentgens for complete discharge. This is attained by using a "pyrex" glass container 10 mm. in diameter, 10 cm. long and having a wall thickness of 1 mm.; with dry air at atmospheric pressure as the enclosed gas and using polystyrene microspheres having diameters of 1 mm., the instrument discharges after a cumulative exposure of five Roentgens, and this total dosage for discharge can be held to an accuracy of 20% or better using ordinary manufacturing methods and equipment. Such an accuracy is acceptable in view of the paucity of our present-day knowledge of quantitative physiological effects of radiation, especially in view of the economic suitability of the present device for mass distribution in the event of atomic disaster.

The instrument may be made to respond to neutron bombardment, and one of the advantages of my invention is the facility with which the instrument can be made to measure neutron radiation in any proportionate relation to its sensitivity to ionizing radiation such as gamma and fast beta. By including in the material from which the transparent container is made varying proportions of elements having a high cross-section to neutrons, such neutrons can be caused to produce ionizing radiation. Boron is among such elements which may be included in the composition of the container wall. The reaction of a slow neutron and the light isotope of boron, for example, produces lithium and alpha particles. Each of these products is capable of causing ionization within the tube, and thus to discharge the electrostatic charge between the container wall and one or more microspheres, allowing the discharged microspheres to fall to the bottom of the tube.

Thus it will be seen that I have provided an easily operated radiation dosimeter having an accuracy commensurate with our understanding and knowledge of the harmful physiological effects of ionizing radiation, and moreover a device capable of being manufactured cheaply in large quantities from materials which in all likelihood will always be available despite shortages of critical materials during times of national emergency.

It will be evident to those skilled in the art that many changes and modifications may be made from the specific forms and materials herein shown and described. All such modifications and changes within the spirit of my invention are intended to be embraced within the scope of the following claims.

I claim:

1. A radiation dosimeter comprising: an elongated, substantially cylindrical, sealed, transparent dielectric container having an ionizable gaseous medium therein, and myriad minute dielectric elements within said container, said elements being of a composition different from that of said container, the interior of the container being virtually moisture-free.

2. A device as stated in claim 1 wherein said dielectric elements are in the form of smooth-surfaced microspheres.

3. A device for measuring ionizing radiation comprising: a hollow, sealed, elongated substantially cylindrical container made of dielectric transparent material and having a smooth inner surface, said container having an ionizable gaseous medium therein; and myriad dielectric elements within said container arranged to acquire an electric charge relative to said container when the container is vigorously moved, the interior of the container being virtually moisture-free.

4. A device for visually indicating ionizing radiation consisting of: a hollow, sealed elongated container having a smooth substantially cylindrical dielectric inner wall at least a portion of said wall being transparent, said container having an ionizable gaseous medium therein; and myriad minute spherical dielectric elements disposed within said container whereby said dielectric elements may be electrostatically charged relative to said container when the latter is moved, the interior of the container being virtually moisture-free.

5. A device of the character stated in claim 4 wherein said container includes a portion of reduced cross section immediately above the level of said minute dielectric elements when uncharged.

6. A radiation dosimeter comprising: a transparent, elongated sealed dielectric container having a smooth inner wall and an ionizable gaseous medium therein; and myriad minute dielectric elements within said container, said elements being of a composition different from that of said container and electrically chargeable relative thereto, a portion of said container being provided with an opaque covering extending to the discharged level of said minute dielectric elements and concealing the same.

7. A dosimeter as stated in claim 6 wherein the material of said container includes an element disintegratable under neutron radiation to emit ionizing radiation.

8. An instrument for measuring ionizing radiation comprising: an elongated, sealed, tubular container of transparent dielectric material and having smooth inner side walls extending, as seen in longitudinal section, substantially parallel throughout the major portion of the length of the container, the container having an ionizable gaseous medium therein; and myriad minute spherical dielectric elements disposed within said container.

9. An instrument as stated in claim 8 wherein said container includes an opaque end portion.

References Cited in the file of this patent

UNITED STATES PATENTS

| 2,048,490 | Bilstein | July 21, 1936 |
| 2,449,880 | Cox | Sept. 21, 1948 |
| 2,459,555 | Tossas | Jan. 18, 1949 |
| 2,496,218 | Kieffer | Jan. 31, 1950 |

FOREIGN PATENTS

| 169,918 | Great Britain | Oct. 13, 1921 |